(12) United States Patent
Belleville et al.

(10) Patent No.: US 12,486,203 B2
(45) Date of Patent: Dec. 2, 2025

(54) COMPOSITION AND METHOD FOR MAKING PARTS CONSISTING OF OXIDE CERAMICS OR HYBRID PARTS BY A STEREOLITHOGRAPHIC TECHNIQUE

(71) Applicant: COMMISSARIAT À L'ÉNERGIE ATOMIQUE ET AUX ÉNERGIES ALTERNATIVES, Paris (FR)

(72) Inventors: Philippe Belleville, Monts (FR); Axel Dieraert, Monts (FR); Bruno Pintault, Monts (FR); Clément Sanchez, Monts (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 1080 days.

(21) Appl. No.: 17/424,635

(22) PCT Filed: Jan. 21, 2020

(86) PCT No.: PCT/FR2020/050074
§ 371 (c)(1),
(2) Date: Jul. 21, 2021

(87) PCT Pub. No.: WO2020/152414
PCT Pub. Date: Jul. 30, 2020

(65) Prior Publication Data
US 2022/0119317 A1 Apr. 21, 2022

(30) Foreign Application Priority Data

Jan. 25, 2019 (FR) .................................. 1900674

(51) Int. Cl.
| C08F 2/46 | (2006.01) |
|---|---|
| B33Y 70/10 | (2020.01) |
| B33Y 80/00 | (2015.01) |
| C04B 35/14 | (2006.01) |
| C04B 35/634 | (2006.01) |
| C08F 2/50 | (2006.01) |

(Continued)

(52) U.S. Cl.
CPC ............ *C04B 35/634* (2013.01); *B33Y 70/10* (2020.01); *B33Y 80/00* (2014.12); *C04B 35/14* (2013.01); *B33Y 10/00* (2014.12); *C04B 2235/5436* (2013.01); *C04B 2235/5445* (2013.01); *C04B 2235/5454* (2013.01); *C04B 2235/6567* (2013.01); *C04B 2235/658* (2013.01); *C04B 2235/9646* (2013.01)

(58) Field of Classification Search
CPC ......... B33Y 70/10; B33Y 70/00; B33Y 80/00; B33Y 10/00; C04B 35/01; C04B 35/46; C04B 35/48; C04B 35/63488; C04B 35/6269; C04B 35/62605; C04B 35/634; C04B 35/10; C04B 35/195; C04B 35/14; C04B 35/632; C04B 35/64; C04B 2235/3244; C04B 2235/602; C04B 2235/5436; C04B 2235/606; C04B 2235/3418; C04B 2235/54; C04B 2235/5418; C04B 2235/5454; C04B 2235/785; C04B 2235/9646; C04B 2235/783; C04B 2235/5472; C04B 2235/656; C04B 2235/61; C04B 2235/6567; C04B 2235/94; C04B 2235/5445; C04B 2235/96; C04B 2235/483; C04B 2235/6026; C04B 2235/658; C04B 2235/3217; C04B 2235/3232; C04B 2235/6565; C04B 2235/6562; C04B 2235/721; C04B 2235/78; C04B 2235/781; C04B 2235/95
USPC ................ 522/83, 71, 1, 189, 184, 6; 520/1
See application file for complete search history.

(56) References Cited

U.S. PATENT DOCUMENTS

| 4,575,330 A | 3/1986 | Hull |
|---|---|---|
| 2010/0029801 A1 | 2/2010 | Moszner et al. |
| 2014/0183799 A1 | 7/2014 | Fischer et al. |

(Continued)

FOREIGN PATENT DOCUMENTS

| WO | 03066326 A2 | 8/2003 |
|---|---|---|
| WO | 2019074015 A1 | 4/2019 |

OTHER PUBLICATIONS

Wu et al, Effect of the particle size and the debinding process on the density of alumina ceramics fabricated by 3D printing based on stereolithography, Aug. 5, 2016, ceramics international, 42, 17290-17294 (Year: 2016).*

(Continued)

*Primary Examiner* — Jessica Whiteley
(74) *Attorney, Agent, or Firm* — Chrisman Gallo Tochtrop LLC

(57) ABSTRACT

A composition which can be photopolymerized to make a part consisting of an oxide ceramic, or a hybrid part comprising at least one oxide ceramic and organic constituents, by a stereolithographic technique, the composition comprising: at least one photopolymerizable organic compound; at least one photo-initiator; at least one precursor of the oxide ceramic wherein the composition comprises from 25% to 70% by mass, relative to the total mass of the composition, of the at least one precursor of the oxide ceramic; and wherein the at least one precursor of the oxide ceramic comprises a mixture comprising a nanometric powder of the oxide ceramic, and at least one other element selected from a micrometric powder of the oxide ceramic and a preceramic compound of the oxide ceramic.

26 Claims, 10 Drawing Sheets

(51) Int. Cl.
  *C08G 61/04*   (2006.01)
  *B33Y 10/00*   (2015.01)

(56)         References Cited

U.S. PATENT DOCUMENTS

2018/0243176 A1*  8/2018  Bonderer ............... B28B 1/001
2019/0002353 A1   1/2019  Eckel et al.
2019/0233326 A1   8/2019  Belleville et al.

OTHER PUBLICATIONS

Specification and drawings for U.S. Appl. No. 17/284,936 entitled "Method for Manufacturing a Single Crystal by Solution Growth Enabling Trapping of Parasitic Crystals" filed Oct. 14, 2019.
Wu, Haidong, et al. "Effect of the particle size and the debinding process on the density of alumina ceramics fabricated by 3D printing based on stereolithography", Ceramics International, vol. 42, No. 15, Aug. 5, 2016, pp. 17290-17294.
Search Report for French application No. 1900674 dated Sep. 27, 2019.
International Search Report for PCT/FR2020/050074 dated May 12, 2020 and translation thereof.
Written Opinion for PCT/FR2020/050074 dated May 12, 2020.

* cited by examiner

COMPOSITION AND METHOD FOR MAKING PARTS CONSISTING OF OXIDE CERAMICS OR HYBRID PARTS BY A STEREOLITHOGRAPHIC TECHNIQUE

CROSS-REFERENCE TO RELATED APPLICATIONS

This is a National Stage application of PCT international application PCT/FR2020/050074, filed on Jan. 21, 2020, which claims the priority of French Patent Application No. 1900674 filed Jan. 25, 2019, both of which are incorporated herein by reference in their entirety.

TECHNICAL FIELD

The present invention relates to a composition for manufacturing, making, a part consisting of at least one oxide ceramic, or a hybrid part comprising at least one oxide ceramic and organic constituents by a stereolithography technique, in particular a laser stereolithography technique.

This composition may optionally be referred to as a photopolymerisable or photocrosslinkable composition.

The invention further relates to a method for manufacturing, making a part consisting of at least one oxide ceramic, or a hybrid part comprising at least one oxide ceramic and organic constituents by a stereolithography technique using said composition.

The technical field of the invention may be defined as being that of the manufacture, preparation of oxide ceramic parts or hybrid parts by the stereolithography technique, in particular by the laser stereolithography technique.

PRIOR ART

Stereolithography is a layer-by-layer additive manufacturing technique used to create complex architectures by photopolymerising a photosensitive, photopolymerisable composition comprising a photosensitive, photopolymerisable resin, at a defined wavelength.

The term resin is often used to refer to the entire photopolymerisable, photosensitive composition including the ceramic precursors and the other constituents, and not just to the photosensitive, photopolymerisable resin alone.

The term "laser stereolithography" (SLA) refers to the technique in which photo-polymerisation is induced by laser radiation, for example UV laser radiation.

Different variants of this technique exist, such as, for example, digital light processing (DLP), or two-photon polymerisation (2PP).

Laser stereolithography, developed in the 1980s (see, for example, the U.S. patent document U.S. Pat. No. 4,575,330), initially made it possible for entirely organic parts to be produced.

Then, in the early 2000s, this process was used to manufacture ceramic parts.

For this purpose, ceramic precursors are incorporated into the photosensitive composition before the desired part is printed by stereolithography.

Ceramic precursors are ceramic powders or ceramic precursor compounds referred to as pre-ceramic compounds such as pre-ceramic polymers. These compounds form the ceramic during the heat treatment.

The part obtained at the end of the stereolithography printing process is called a green part.

Then, during a heat treatment step, the organic portion of the green part is removed by debinding, whereas the inorganic portion is consolidated and densified by sintering.

At the end of the process, a ceramic part with an architecture that is homothetic with the initial green part is obtained. The properties of the ceramic mainly depend on the chemical nature thereof (oxide, carbide, or mixed compound), the geometry thereof, the density thereof and the microstructure thereof.

The final architecture and microstructure are influenced by the composition of the resin, by the printing process and by the heat treatment carried out.

The production of ceramics by stereolithography thus requires the formulation of a composition containing a photopolymerisable resin as well as ceramic precursors. When these precursors are ceramic powders, such as silica, alumina or zirconia powders, a filler content of about 50 vol % is generally required in order to obtain a dense ceramic at the end of the heat treatment step.

Care must also be taken to ensure that the viscosity of the composition does not exceed 3 Pa·s to ensure good flow of the composition between the printing of two successive layers.

If the filler content is lower, the ceramic will have a lower density, and thus lower mechanical properties. Defects may also appear during the sintering step. Increasing the filler content of a resin means increasing the viscosity thereof. Moreover, incorporating ceramic particles into the resin reduces the print resolution that can be achieved due to the diffraction of the laser beam by the particles. Diffraction is the result of the optical index difference between the resin (between 1.3 and 1.5) and the ceramic particles (1.5 for silica, 1.7 for alumina, 1.85 for zirconia).

These two elements, i.e. the viscosity and the diffraction, limit the complexity of the parts that can be produced by stereolithography, in particular by SLA.

The formulation of the stereolithography resin, in particular of the SLA resin, is crucial to control the polymerisation reactions and this directly influences the geometry of the printed part.

Two types of polymers are primarily used as stereolithography resins, namely: resins based on epoxy or vinyl polymers and those based on acrylate-type polymers. SLA resin formulations based on acrylate polymers are most commonly used to produce ceramics by SLA due to the lower viscosity thereof and the high reactivity of the acrylate functions. Moreover, radical-type polymerisation is triggered by the decomposition of a radical photo-initiator. These photo-initiators are characterised by a high initiation rate. A very wide variety of acrylate polymers exists. The longer the carbon chain and the higher the number of acrylate functions, the more viscous the polymer and the greater its cross-linking after polymerisation. The mechanical properties of the green part are then higher and the modulus of elasticity thereof is lower compared to those of a polymer with a shorter carbon chain length or with a functionality. However, the shrinkage that occurs during polymerisation increases as the functionality of the monomers increases. Moreover, with a functionality and a high chain length, the polymerisation rate is higher and the flexibility decreases, resulting in a greater polymerised volume, and thus a decrease in print resolution.

A stereolithography printer, in particular for SLA stereolithography, and a printing process, which are used to prepare a green part, are shown in FIG. 1, described hereafter.

It should be noted that in this figure, the printed part is disposed on the bottom face of the printing plate (print bed).

Such a disposition allows hollow parts to be printed, but on the other hand requires strong adhesion between the printing plate and the printed part. Moreover, the part is self-supporting during the process. The green part must thus have sufficient mechanical properties to prevent it from breaking during printing. Printing parts containing ceramic powders requires even higher mechanical properties due to the weight generated by the presence of the powders.

The higher the volume fraction of the powder, the higher the mechanical properties must be. Controlling the formulation of the photosensitive, photopolymerisable compositions is thus key to maintain the best possible print resolution while ensuring that the mechanical properties are sufficient for the part to be successfully printed in full.

The chemical nature, the size, the geometry, the filler content and the particle size distribution of the powders used are parameters that influence the viscosity of the photosensitive composition.

The international patent application WO-A2-03/066326 describes a method for preparing ceramic parts made of zirconia or alumina from a resin filled with 50 to 60 vol % of ceramic powder. These suspensions have a viscosity of greater than 10,000 Pa·s (for a shear rate of 0.1 s$^{-1}$). Complex geometries cannot be printed from these preparations.

Most stereolithography processes, in particular SLA stereolithography processes of the prior art use micrometric oxide ceramic powders as precursors.

Photocrosslinkable compositions with high filler contents (ceramic powder content), for example 50 vol %, can be prepared using such micrometric powders.

Such compositions are well suited for the preparation of solid parts in which fine detail is not desired. A highly viscous composition can then indeed be used.

However, if the composition is viscous, a very fine print cannot be obtained, with a small level of detail, for example less than 250 microns or even 200 microns, and a low resolution, for example less than 50 microns.

If, however, compositions are prepared that comprise micrometric powders to obtain parts with a fine print, then these parts are fragile.

The use of nanometric oxide ceramic powders as precursors would be of interest.

More specifically, the advantage of nanometric powders is that they can be sintered at a lower sintering temperature than micrometric particles.

The parts obtained with nanometric powders have a finer microstructure, a finer level of detail than parts obtained with micrometric powders, and the mechanical properties thereof are better.

However, compositions that have both a sufficiently high filler content, for example greater than or equal to 25 wt % or 30 wt %, in order to obtain good mechanical properties, and a low viscosity in order to prepare parts with complex architectures, and a minimal printed level of detail, i.e. high fineness and low resolution, cannot be obtained with nanometric powders.

In other words, micrometric powders can be used to obtain compositions with a higher filler content than nanometric powders, thus with a higher viscosity and the parts obtained have a lower fineness, whereas nanometric powders cannot procure a sufficient filler content, for example greater than or equal to 25 wt % or 30 wt % and a low viscosity.

In other words, the use of a single population of nano-sized particles does not allow resins to be produced with a high filler content (for example greater than 25 wt % or 30 wt %) and that are sufficiently fluid (presence of resin flow between the printing of two layers) for the production of complex architectures.

In view of the above, there is thus a need for a composition for manufacturing a part consisting of at least one oxide ceramic or a hybrid part comprising at least one oxide ceramic and organic constituents, by a stereolithography technique, in particular a technology using UV radiation such as SLA stereolithography, which has a high filler content, a low viscosity, for example less than or equal to 5 Pa·s at 20° C., preferably less than or equal to 1 Pa·s at 20° C., for a shear rate of 50 s$^{-1}$, and which thus allows parts with complex geometries or architectures to be prepared, with a minimum printed level of detail and resolution, and with excellent mechanical properties (i.e. in particular resistant and easy to handle parts).

Furthermore, in view of the above, there is a need for a composition for manufacturing a part consisting of at least one oxide ceramic or a hybrid part comprising at least one oxide ceramic and organic constituents, by a stereolithography technique and which does not have the defects, drawbacks and disadvantages of the compositions of the prior art, and which overcomes the problems created by the compositions of the prior art.

The goal of the present invention is to provide a composition for manufacturing a part consisting of at least one oxide ceramic or a hybrid part comprising at least one oxide ceramic and organic constituents, by a stereolithography technique, and which meets, inter alia, the aforementioned needs and which fulfils the aforementioned requirements and criteria for such a composition.

DESCRIPTION OF THE INVENTION

This goal and still other goals are achieved according to the invention by a composition for manufacturing a part consisting of at least one oxide ceramic, or a hybrid part comprising at least one oxide ceramic and organic constituents, by a stereolithography technique, said composition comprising:

at least one photopolymerisable organic compound;

at least one photoinitiator;

at least one precursor of the oxide ceramic (oxide ceramic precursor);

characterised in that:

said composition comprises from 25 wt % to 70 wt %, preferably from 25 wt % to 60 wt %, more preferably from 30 wt % to 60 wt %, better from 40 wt % to 60 wt %, and still better from 50 wt % to 60 wt %, relative to the total weight of the composition, of the at least one precursor of the oxide ceramic (this percentage is typically referred to as the filler content); and in that:

said at least one precursor of the oxide ceramic comprises, preferably consists of, a mixture comprising, preferably consisting of, a nanometric powder of the oxide ceramic, and at least one other element selected from a micrometric powder of the oxide ceramic and a pre-ceramic compound of the oxide ceramic;

on the understanding that in order to determine the weight of the at least one precursor of the oxide ceramic, the weight of the pre-ceramic compound of the oxide ceramic is brought to the weight of the oxide ceramic obtainable from this pre-ceramic compound of the oxide ceramic.

This composition may optionally be referred to as a photopolymerisable or photocrosslinkable composition.

The goal of the invention is achieved regardless of the other element present in the composition according to the invention.

The total amount of precursor of the oxide ceramic may be referred to as the filler content (in wt % of the composition).

The viscosity of the composition according to the invention is generally less than or equal to 5 Pa·s at 20° C., preferably less than or equal to 1 Pa·s at 20° C., for a shear rate of 50 s$^{-1}$.

This viscosity is measured with a standard laboratory viscometer.

The terms "pre-ceramic compound of the oxide ceramic" are clear to the man skilled in the art.

The pre-ceramic compounds of the oxide ceramic are of course different from the oxide ceramics and from the powders of these oxide ceramics.

These pre-ceramic compounds of the oxide ceramic are generally organometallic or organometalloid compounds.

These pre-ceramic compounds of the oxide ceramic can generally be defined as compounds that can produce an oxide ceramic generally upon heat treatment.

A micrometric powder is understood to mean that this powder consists of particles with a number average size of 1 to 10 µm, preferably 3 to 10 µm.

This size can be measured by a dynamic light scattering technique with a laser particle size analyser (see below), and/or by observation with a scanning electron microscope (SEM) and/or a transmission electron microscope (TEM).

A nanometric powder is understood to mean that this powder consists of particles with a number average size of 10 to 150 nm, preferably 20 to 30 nm.

This size can be measured by a dynamic light scattering technique with a laser particle size analyser (see below), and/or by observation with a scanning electron microscope (SEM) and/or transmission electron microscope (TEM).

Optionally, the particles of the nanometric powder of the oxide ceramic and/or of the micrometric powder of the oxide ceramic may be functionalised by grafting.

The composition according to the invention in particular allows mechanically resistant parts to be produced, having low thermal and electrical conductivity because they are carbon-free (for parts consisting of at least one oxide ceramic), with complex architectures and a small level of detail, for example less than or equal to 250 µm, or even 200 µm, and a high resolution, for example of +/−50 µm.

The level of detail (feature size) is understood to mean the smallest size of the printed patterns.

The resolution is understood to mean the difference between the desired size of the printed patterns and the size that is actually achieved in the manufactured part.

Said at least one precursor of the oxide ceramic may comprise, preferably consist of, a mixture comprising, preferably consisting of, a nanometric powder of the oxide ceramic, and a micrometric powder of the oxide ceramic.

Photopolymerisable compositions for stereolithography comprising the combination of a nanometric powder of an oxide ceramic and a micrometric powder of an oxide ceramic, in other words a bimodal particle population, are neither described nor suggested in the prior art.

Surprisingly, it was found that, according to the invention, the formulation of compositions which are highly filled with precursor powders, for example up to 40 wt %, 50 wt % or even 60 wt %, while being fluid, can be achieved using a distribution of a bimodal particle distribution, population.

A fluid composition is understood to mean that these compositions have the viscosity specified hereinabove.

These compositions allow ceramic parts with complex architectures, and which are mechanically resistant (which can be manipulated, easy to handle) to be produced.

In particular, these parts have a small printable level of detail that is in particular less than 200 µm, and a minimum resolution that is in particular better than 50 µm.

These parts also have a low shrinkage, in particular less than 20 linear %.

Advantageously, the mixture comprising, preferably consisting of, a nanometric powder of the oxide ceramic and a micrometric powder of the oxide ceramic can comprise, preferably consist of, from 5 wt % to 50 wt %, preferably from 10 wt % to 30 wt %, relative to the weight of the mixture, of the nanometric powder of the oxide ceramic and from 50 wt % to 95 wt %, preferably from 70 wt % to 90 wt %, relative to the weight of the mixture, of the micrometric powder of the oxide ceramic.

In particular, in the preferred ranges from 10 wt % to 30 wt %, relative to the weight of the mixture, of the nanometric powder of the oxide ceramic and from 70 wt % to 90 wt %, relative to the weight of the mixture, of the micrometric powder of the oxide ceramic, the composition is guaranteed to be able to have a high overall filler content, for example greater than or equal to 40 wt %, and a sufficiently low viscosity (less than or equal to 5 Pa·s, preferably less than or equal to 1 Pa·s for a shear rate of 50 s$^{-1}$) to produce parts with complex architectures and which are resistant (easy to handle), whereas this is not always the case with a mixture outside these preferred ranges and comprising, for example, 60 wt %, relative to the weight of the mixture, of the micrometric powder of the oxide ceramic and 40 wt %, relative to the weight of the mixture, of the nanometric powder of the oxide ceramic.

For the same filler content (for example 40 wt %), the mechanical properties of a ceramic part produced from a composition containing a bimodal powder mixture in the proportion of 70 wt % of micrometric powder/30 wt % of nanometric powder are the highest, compared to other particle size distributions such as 90 wt % of micrometric powder/10 wt % of nanometric powder or 80 wt % of micrometric powder/20 wt % of nanometric powder.

Alternatively, said at least one precursor of the oxide ceramic precursor may comprise, preferably consist of, a mixture comprising, preferably consisting of, a nanometric powder of the oxide ceramic, and a preceramic compound of the oxide ceramic.

Photopolymerisable compositions for stereolithography comprising the combination of a nanometric powder of an oxide ceramic and a pre-ceramic compound of the oxide ceramic are neither described nor suggested in the prior art.

Also surprisingly, it was found that the use of "hybrid" precursors comprising the combination of a nanometric powder of an oxide ceramic and a pre-ceramic compound of the oxide ceramic leads to parts with complex architectures and good mechanical properties, and even at a low precursor content (for example less than 40 wt %).

Advantageously, said at least one precursor of the oxide ceramic (oxide ceramic precursor) may comprise, preferably consist of, a mixture comprising, preferably consisting of:
  a mixture of a nanometric powder of the oxide ceramic and of a micrometric powder of the oxide ceramic, and
  a pre-ceramic compound of the oxide ceramic.

That is to say that the precursor thus comprises the combination of a pre-ceramic compound of the oxide ceramic and a bimodal particle population.

The ratio of the amount of nanometric powder of the oxide ceramic or of the mixture of the nanometric powder of the oxide ceramic and of the micrometric powder of the oxide ceramic to the amount of pre-ceramic compound (or vice-versa) modulates the final microstructure of the ceramic.

Shrinkage may also be controlled by this ratio. It may be greater than 35 linear %.

Advantageously, the composition can comprise, preferably consist of, from 40 wt % to 90 wt %, preferably from 50 wt % to 75 wt %, for example 50 wt %, relative to the total weight of the composition, of the nanometric powder of the oxide ceramic or of the mixture of the nanometric powder of the oxide ceramic and of the micrometric powder of the oxide ceramic; and from 10 wt % to 60 wt %, preferably from 25 wt % to 50 wt %, for example 50 wt %, relative to the total weight of the composition, of the pre-ceramic compound of the oxide ceramic.

The use of this hybrid composition makes it possible to achieve finer levels of details at the same filler content than when the precursor comprises ceramic powders only.

The dimensions of the green part after printing are identical to those of a part whose precursor solely comprises ceramic powders.

However, the shrinkage observed during sintering is greater, which explains why the achievable level of detail is finer. The lower the conversion rate of the pre-ceramic compound, the greater the shrinkage observed during sintering.

The achievable level of detail and the mechanical properties of the ceramic depend on a plurality of parameters. For an equivalent filler content (for example 40 wt %), the achievable level of detail becomes finer as the proportion of pre-ceramic compounds such as pre-ceramic polymers increases.

The formulation of a composition with a high filler content, for example 40 wt %, is above all possible through the use of only nanometric powders and pre-ceramic precursor compounds such as pre-ceramic polymers, but also through the use of a bimodal ceramic powder distribution (use of micrometric and nanometric powders).

The level of detail that can be printed with these compositions is less than or equal to 250 µm, or even less than or equal to 200 µm. The overall dimensions of the part are also smaller compared to an equivalent structure printed from precursors of the ceramic powder type due to the shrinkage induced by the conversion of the pre-ceramic precursor compound to ceramic.

Moreover, the dimensional anisotropy during printing and the shrinkage anisotropy during sintering lead to an increase in the solid volume fraction of the structure prepared from hybrid precursors, compared to the same structure made only from inorganic precursors of the ceramic powder type. As a result, the mechanical properties of this ceramic are improved.

For a determined overall filler content, for example 40 wt %, it is possible to use only nanometric particles and pre-ceramic compounds such as pre-ceramic polymers to obtain the best possible compromise between mechanical properties and a fine level of detail, however a bimodal distribution of ceramic powders and pre-ceramic compounds may also be used. As the powder content increases, the level of detail that can be printed decreases and the mechanical properties increase, and when the content of pre-ceramic compounds such as pre-ceramic polymers is too high, the mechanical properties of the ceramic may become degraded.

Advantageously, the oxide ceramic may be selected from metals oxides, metalloids oxides, mixed metals and/or metalloids oxides, and mixtures of said metals oxides, metalloids oxides, and mixed metals and/or metalloids oxides.

The oxide ceramic may be selected notably from oxides and mixed oxides of transition metals such as zirconia, titanium oxide, and titanium-hafnium oxide; silica; alumina; and mixtures thereof.

Advantageously, the pre-ceramic compound of the oxide ceramic, such as silica, may be selected from polysiloxanes; geopolymers, for example aluminosilicates geopolymers; silsesquioxanes; and mixtures thereof. Among the polysiloxanes (or silicones), the compounds marketed by WACKER® under the name SILRES®, such as SILRES® H44, which are silicone resins, more precisely polysiloxanes highly cross-linked with organic side groups may be cited.

Advantageously, the composition may comprise from 30 wt % to 75 wt %, preferably from 40 wt % to 60 wt %, relative to the total weight of the composition, of the at least one photopolymerisable organic compound.

Advantageously, the at least one photopolymerisable organic compound may be selected from photopolymerisable organic compounds comprising at least one function selected from acrylate, epoxy, urethane and vinyl functions.

The photopolymerisable organic compound may be selected in particular from polyacrylates (generally non-polymeric) comprising more than two acrylate functions, such as pentaerythritol triacrylate or pentaerythritol tetraacrylate; polymers comprising at least two acrylate functions, such as poly(ethylene glycol) diacrylates; non-polymeric compounds comprising one or two acrylate functions, referred to as reactive diluents, such as 1,6-hexanediol diacrylate (HDDA) and 2-hydroxyethyl acrylate; and mixtures thereof.

In particular, the composition may comprise at least one first photopolymerisable organic compound selected from polyacrylates (generally non-polymeric) comprising more than two acrylate functions, such as pentaerythritol triacrylate or pentaerythritol tetraacrylate, and polymers comprising at least two acrylate functions, such as poly(ethylene glycol) diacrylates; and at least one second photopolymerisable organic compound selected from non-polymeric compounds comprising one or two acrylate functions, referred to as reactive diluents, such as 1,6-hexanediol diacrylate (HDDA) and 2-hydroxyethyl acrylate.

Advantageously, the composition may comprise from 10 wt % to 60 wt %, preferably from 20 wt % to 40 wt % relative to the total weight of the composition, of the at least one first photopolymerisable organic compound, and from 10 wt % to 50 wt %, preferably from 20 wt % to 40 wt % relative to the total weight of the composition, of the at least one second photopolymerisable organic compound.

The weight ratio of the first photopolymerisable organic compound to the second polymerisable organic compound may be from 2:1 to 1:1, for example 1:1.

In other words, the photocrosslinkable, photopolymerisable organic compounds may be classified into two categories, i.e.:

Polyacrylates with high functionality (for example 2 or more than 2 acrylate functions) and/or with long carbon chains, such as Poly(ethylene glycol) diacrylate 700, Pentaerythritol triacrylate or Pentaerythritol tetraacrylate. The higher the number of acrylate functions, and the longer the carbon chain, the more cross-linked the polymer network will be and the better the mechanical properties will be. On the other hand, this results in a larger polymerised volume, which in turn increases the minimum size that can be printed. Shrinkage during polymerisation increases with the functionalisation of the polymer.

Monoacrylates or polyacrylates with low functionality (for example 1 or 2 acrylate functions) and with short carbon chains, such as 1,6-hexanediol diacrylate (HDDA) or 2-hydroxyethyl acrylate (HEA). These compounds act as a reactive diluent.

The level of detail (feature size that) can be printed as well as the resolution depends directly on the proportion of these compounds. The composition according to the invention may be adapted to print complex architectures. The higher the content of the second photopolymerisable organic compound (reactive diluent), the lower the level of detail that can be printed. However, the mechanical properties of the green part must be sufficient in order to withstand the printing process.

The content of the first photopolymerisable organic compound (polyacrylate) must thus be high enough to provide these mechanical properties.

As mentioned hereinabove, the weight ratio of the first photopolymerisable organic compound to the second polymerisable organic compound is preferably 1:1, which allows for both a small level of detail and good mechanical properties of the green part.

Advantageously, the composition may comprise from 0.05 wt % to 1.00 wt % of the weight of the composition, of the at least one photoinitiator.

The cross-linking of acrylates, in particular, takes place by radical polymerisation. These reactions are initiated by a photoinitiator of the radical type. The mechanisms are based on the excitation of the photoinitiator by absorption of a photon such as a UV photon, then on the generation of a radical during the de-excitation mechanism. The photoinitiator must have a high initiation rate to ensure a high conversion rate of the radical reaction, and thus a good printing resolution. It must also absorb at the wavelength of the photon radiation, for example at the emission wavelength of the SLA printer laser.

Such photoinitiators are well known to the man skilled in the art.

One example that may be mentioned is the compound marketed by CIBA® under the name Irgacure® 819, which is bis(2,4,6-trimethylbenzoyl)-phenylphosphinoxide.

Advantageously, the composition can further comprise at least one UV absorbing agent, preferably in an amount of 0.05 wt % to 1 wt % of the weight of the composition.

Such UV absorbing agents are well known to the man skilled in the art.

Examples that may be mentioned include the compound marketed by SIGMA-ALDRICH® under the name SUDAN® 1, which is 1-(phenylthiazenyl)naphthalene-2-ol, or the compound known as UV Absorber 133.

Advantageously, the composition can further comprise at least one dispersing agent, preferably in an amount of 1 wt % to 5 wt %, more preferably in an amount of 2 wt % to 4 wt % of the weight of the composition.

The dispersing agent may in particular be Bis[2-(methacryloyloxy)ethyl] phosphate.

The use of a dispersing agent helps in obtaining a fluid composition. The dispersant also limits the settling of the particles, thus increasing the useful life of the composition.

Preferably, the dispersing agent is used in combination with a high concentration of reactive diluent, which further helps obtain a fluid composition.

The particles of the nanometric powder of the oxide ceramic and/or of the micrometric powder of the oxide ceramic may be functionalised by grafting, for example with a compound such as 3-(trimethoxysilyl)-propyl methacrylate.

These grafted particles may in particular replace the dispersing agent, or be used in addition thereto.

Advantageously, the composition may further comprise at least one plasticising agent; preferably, said plasticising agent is selected from glycols such as polyethylene glycol; phthalates such as dibutyl phthalate; and glycerol.

The invention further relates to a method for manufacturing, making a part consisting of at least one oxide ceramic, or a hybrid part comprising at least one oxide ceramic and organic constituents by a stereolithography technique, comprising the following successive steps:

a) a substrate is brought into contact with a layer of the composition described hereinabove;

b) one or more selected area(s) of the layer of the composition are exposed to a photon radiation, whereby a first locally-polymerised layer of the part is obtained;

c) the first locally-polymerised layer is brought into contact with a layer of the (photopolymerisable) composition described hereinabove;

d) one or more selected area(s) of said layer of the composition are exposed to a photon radiation, whereby a second locally-polymerised layer of the part is obtained;

e) steps c) and d) are repeated as many times as necessary for the locally-polymerised layers to constitute a green part;

f) the green part is separated from the substrate;

g) optionally, at the end of step e) and/or step f), the green part is cleaned by bringing it into contact with an organic solvent, preferably selected from alcohols such as ethanol, propanols and mixtures thereof;

h) optionally, the cleaned green part is dried;

i) heat treatment is carried out to completely remove the organic constituents from the green part and to sinter and densify the green part, thereby obtaining a part consisting of at least one oxide ceramic; or else heat treatment is carried out to partially remove the organic constituents from the green part, thereby obtaining a hybrid part comprising at least one oxide ceramic and organic constituents.

The method according to the invention differs from the methods of the prior art essentially by the specific photopolymerisable composition according to the invention, described hereinabove.

The method according to the invention thus has all the unexpected effects and advantages described hereinabove and inherent, due to this composition.

Steps c) and d) may be repeated from 1 to 2,000 times, preferably from 2 to 1,000 times, more preferably from 3 to 600 times, even more preferably from 4 to 500 times.

Advantageously, the photon radiation may be a UV radiation, preferably a UV laser radiation.

Advantageously, during, in step i), the heat treatment carried out to completely remove the organic constituents from the green part and to sinter, densify the green part may comprise a plateau at a plateau temperature from 800° C. to 1,700° C., preferably from 1,100° C. to 1,300° C., for example 1,200° C., for a period of 1 to 10 hours, for example 5 hours; and the heat treatment to partially remove the organic constituents from the green part may comprise a plateau at a temperature from 100° C. to 500° C., preferably from 100° C. to 200° C., more preferably from 150° C. to 200° C. for a period of 1 to 10 hours, for example 5 hours.

Advantageously, during, in step i), during the heat treatment carried out to completely remove the organic constituents from the green part and to sinter, densify the green part, the plateau temperature is reached within a period of 10 to 40 hours (slow temperature rise), for example 30 hours, preferably by observing one or more intermediate plateaus at temperatures below the plateau temperature. These one or more intermediate plateau(s) may last from 3 to 5 hours.

The heat treatment may be carried out in an air atmosphere, in a neutral gas atmosphere such as argon, or in a reducing atmosphere.

Advantageously, the process according to the invention may further comprise, at the end of step i), a step wherein the part consisting of at least one oxide ceramic, or the hybrid part comprising at least one oxide ceramic and organic constituents, which acts as a ceramic reinforcement with an open-pored three-dimensional porous structure forming a matrix or lattice, receives a thermal insulator such as an aerogel or a metal foam.

Advantageously, the process according to the invention can further comprise, at the end of step i), a step wherein the part consisting of at least one oxide ceramic, or the hybrid part comprising at least one oxide ceramic and organic constituents, which has an open-pored three-dimensional porous structure, is functionalised by chemical groups, for example by functional groups having optical properties, for example phosphorescent or luminescent properties.

The invention further relates to a part consisting of at least one oxide ceramic, or a hybrid part comprising at least one oxide ceramic and organic constituents, obtained by the method according to the invention.

Preferably, the part consisting of at least one oxide ceramic, obtained by the method according to the invention, generally contains less than 100 ppm (by weight) of carbon. This very low residual carbon content makes up one of the fundamental differences between the parts prepared by the method according to the invention and the parts prepared by the methods of the prior art.

This part may be considered to be made of pure oxide.

This part, which consists of at least one oxide ceramic, made of a pure oxide, and which contains little or no carbon, thus has good thermal and electrical insulation properties.

Preferably, the hybrid part comprising at least one oxide ceramic and organic constituents, obtained by the method according to the invention, generally comprises more than 10 wt % of carbon, advantageously, said hybrid part comprises more than 10 wt % of carbon and at most 50 wt % of carbon.

Such a hybrid part has the advantage of being less rigid than the part consisting of at least one oxide ceramic, and of having a certain flexibility, which may be of a certain interest in certain applications.

Advantageously, the part consisting of at least one oxide ceramic or the hybrid part comprising at least one oxide ceramic and organic constituents, obtained by the method according to the invention; or the above-described preferred part consisting of at least one oxide ceramic, or the above-described preferred hybrid part comprising at least one oxide ceramic and organic constituents, may comprise a dense three-dimensional structure, or an open-pored three-dimensional porous structure that may serve as an open-pored three-dimensional porous host matrix (lattice).

The part consisting of at least one oxide ceramic, or the hybrid part comprising at least one oxide ceramic and organic constituents may act as a ceramic reinforcement with an open-pored three-dimensional porous structure forming a matrix or lattice, receiving a thermal insulator such as an aerogel or a metal foam.

The part consisting of at least one oxide ceramic or the hybrid part comprising at least one oxide ceramic and organic constituents, with an open-pored three-dimensional porous structure, may be functionalised by chemical groups, for example by functional groups having optical properties, for example phosphorescent or luminescent properties.

The part consisting of at least one oxide ceramic or the hybrid part comprising at least one oxide ceramic and organic constituents, obtained by the method according to the invention; or the above-described preferred part consisting of at least one oxide ceramic, or the above-described preferred hybrid part comprising at least one oxide ceramic and organic constituents, may be a catalyst.

The invention will be better understood upon reading the following detailed description, given in particular of specific embodiments of the invention. This detailed description is provided for illustrative purposes only and is not intended to limit the invention, given with reference to the accompanying drawings.

This method may be, in particular, the method according to the invention for manufacturing a part made of at least one oxide ceramic by an SLA stereolithography technique.

Figure 2:
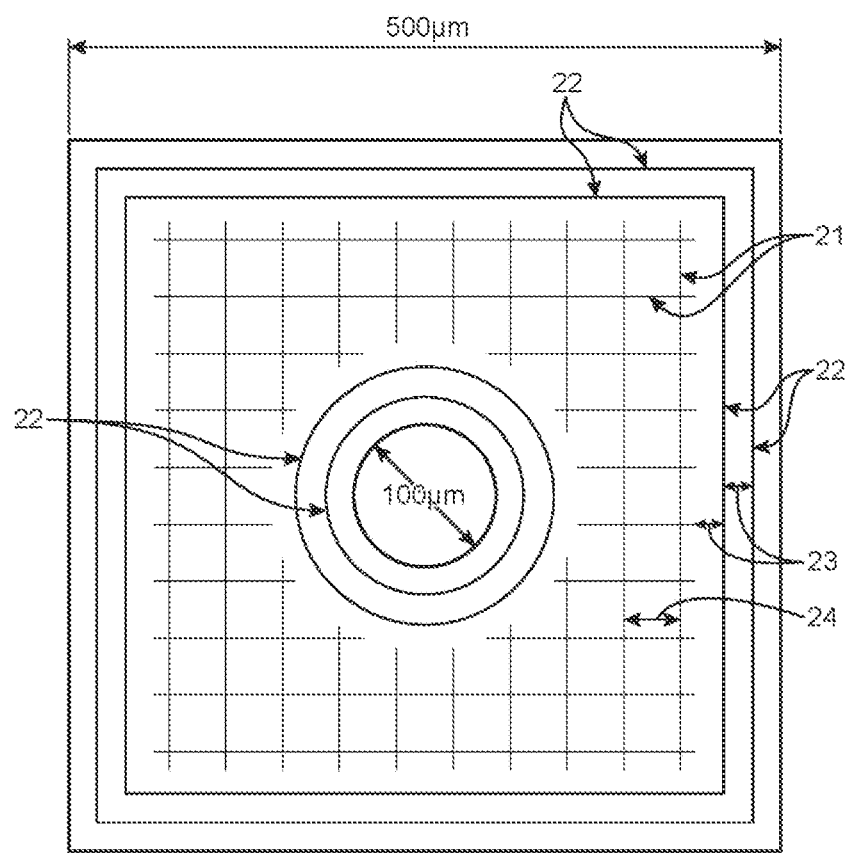

FIG. 2 shows the hatching, and the contours made by the laser during the polymerisation process of a layer.

Figure 3:
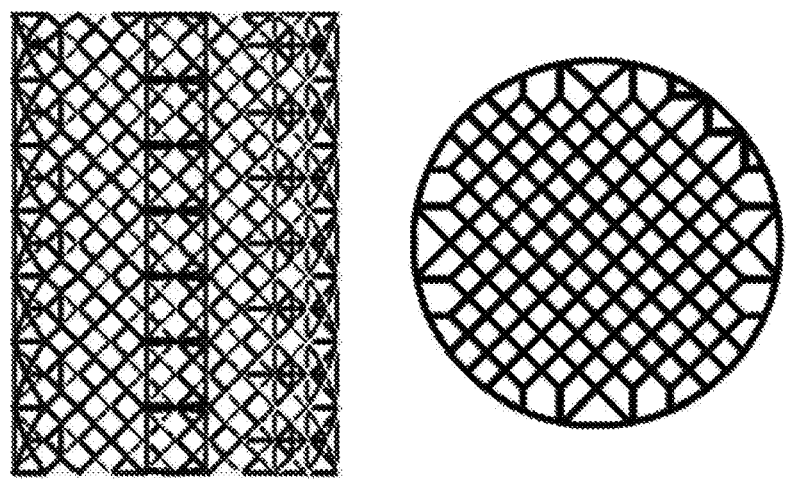

FIG. 3 shows a digital file used to print the microstructured cylinders of the examples.

Figure 4:
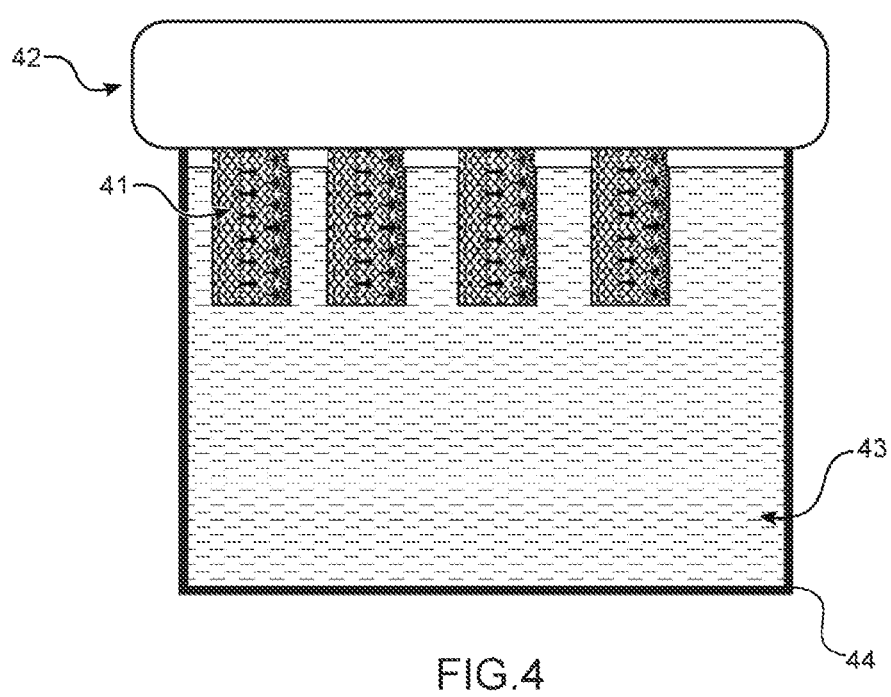

FIG. 4 is a schematic vertical sectional view showing the first cleaning step that may be implemented in the method according to the invention, and which is in particular implemented in the examples.

Figure 5:
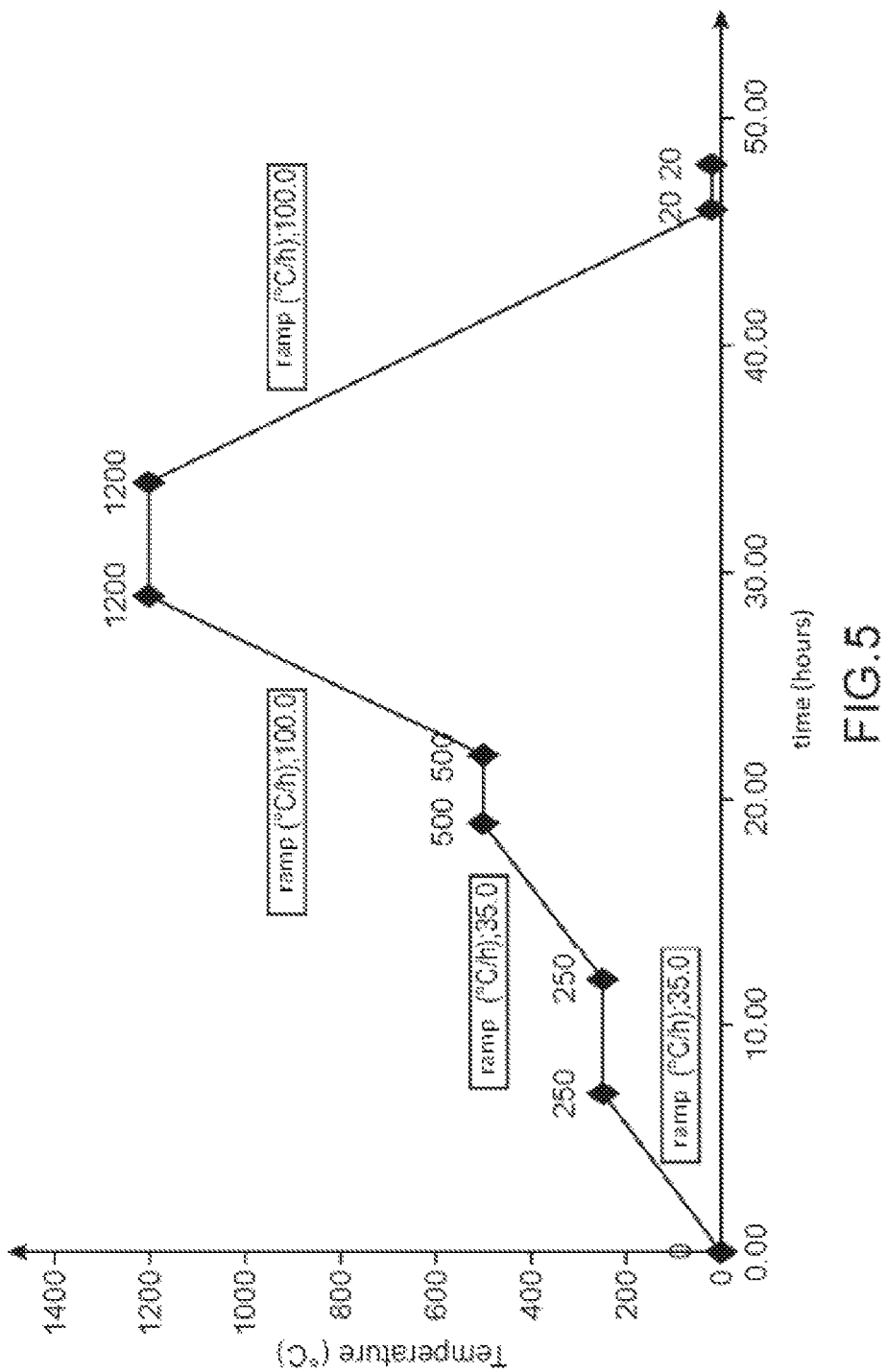

FIG. 5 is a graph showing a thermal debinding-sintering cycle implemented in the method according to the invention.

The x-axis shows the time (in hours), and the y-axis shows the temperature (in ° C.).

Figure 6:
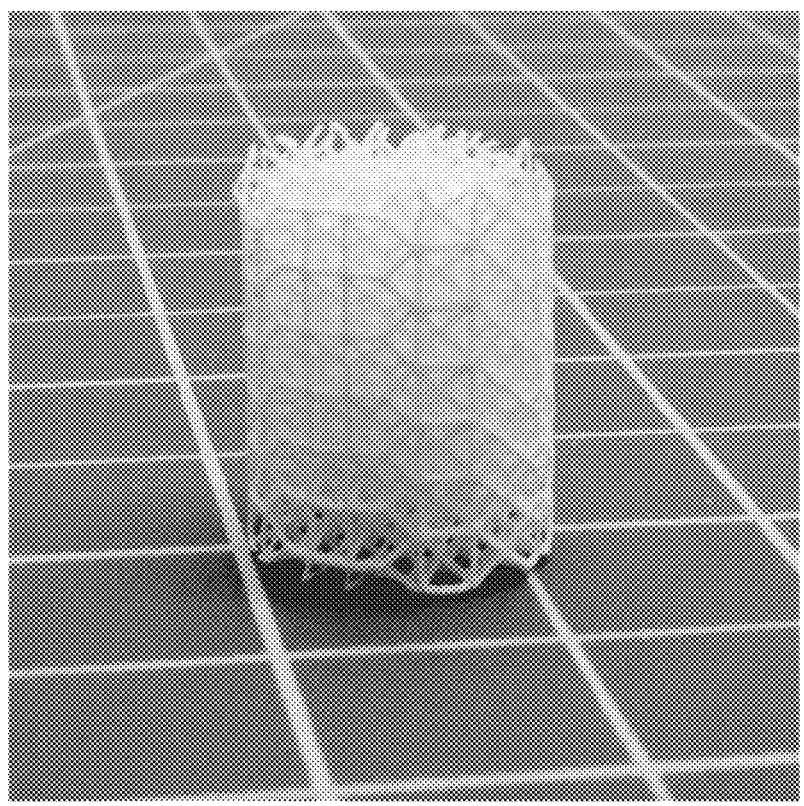

FIG. 6 is a photograph of the part, which is a microstructured cylinder, manufactured in Example 1.

The tiles in this photograph have a side length of 2.54 cm (1 inch).

Figure 7:
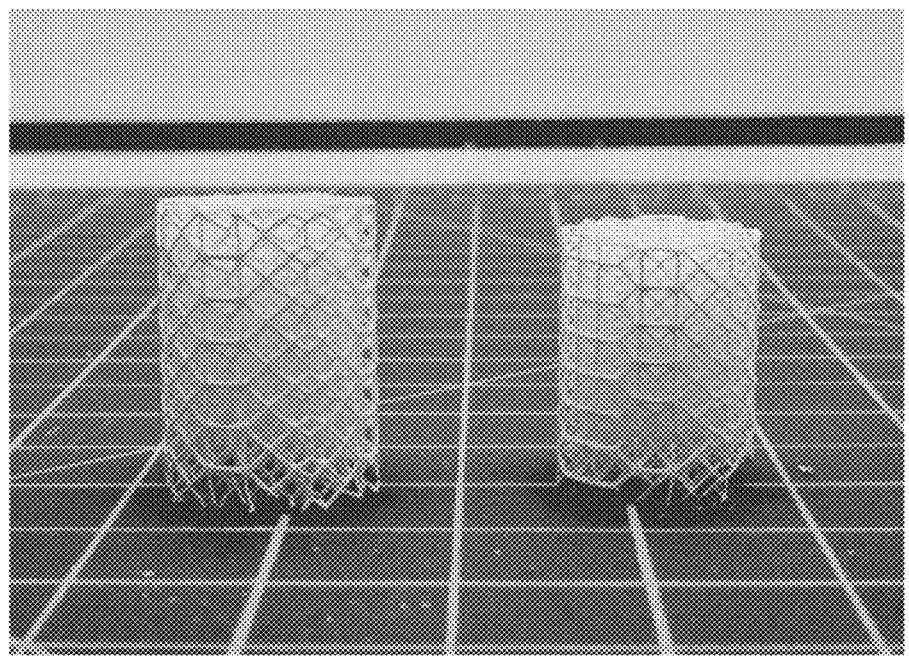

FIG. 7 is a photograph showing the part, which is a microstructured cylinder, manufactured in Example 2 (on the left) and the part, which is a microstructured cylinder, manufactured in Example 3 (on the right).

Figure 8:
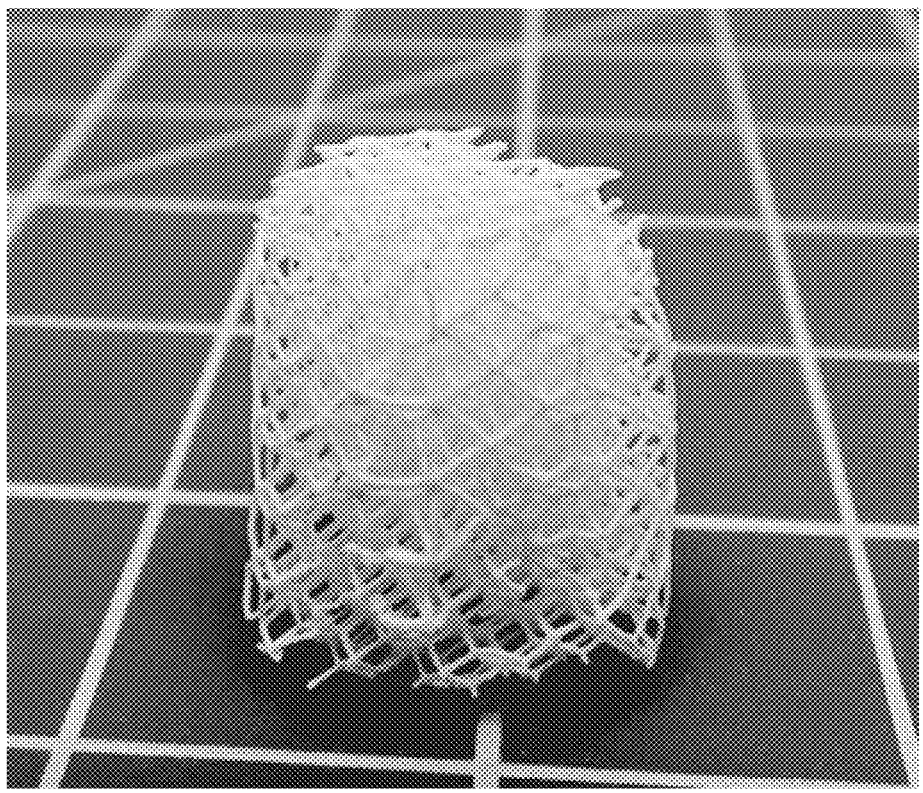

FIG. 8 is a photograph of the part, which is a microstructured cylinder, manufactured in Example 4.

The tiles in this photograph have a side length of 2.54 cm (1 inch).

Figure 9:
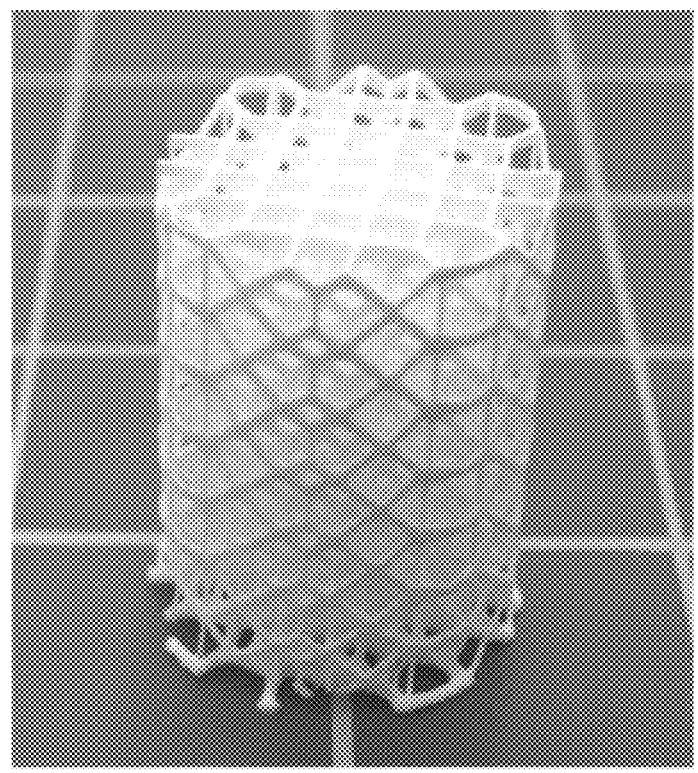

FIG. 9 is a photograph of the part, which is a microstructured cylinder, manufactured in Example 5.

The tiles in this photograph have a side length of 2.54 cm (1 inch).

Figure 10:
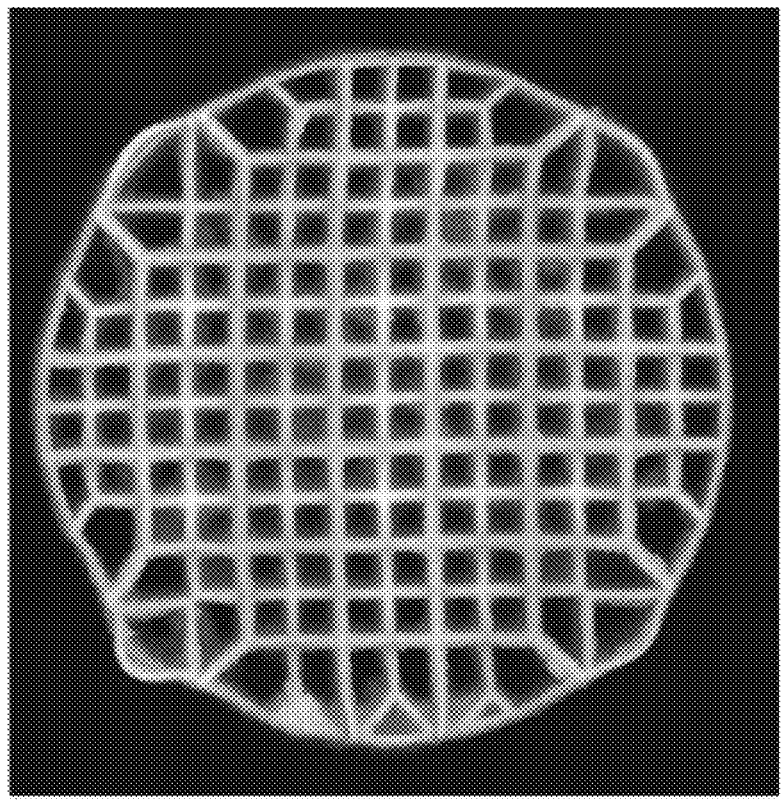

FIG. 10 is a photograph, top view of the part, which is a microstructured cylinder, manufactured in Example 5.

DETAILED DESCRIPTION OF SPECIFIC EMBODIMENTS

The following detailed description is essentially given in relation to the method according to the invention, this method using the composition according to the invention, as described hereinabove.

Furthermore, the following description is rather given in the context of photopolymerisation by UV radiation emitted by a laser, but it is clear that the invention is not limited thereto and that photopolymerisation could be carried out by radiation that differs from UV radiation, for example by visible radiation.

Similarly, the radiation is not limited to radiation emitted by a laser, and could be a radiation emitted by, for example, a so-called DLP (Digital Light Process) projector.

Figure 1:
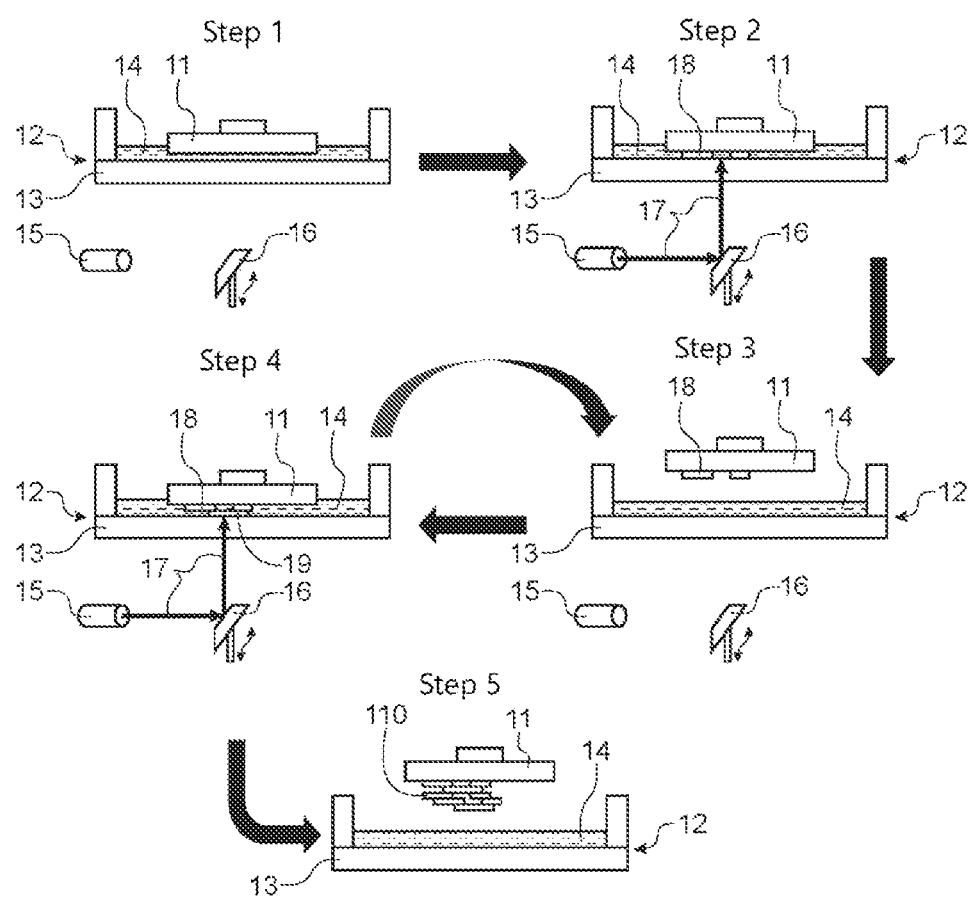
FIG. 1 shows, through schematic vertical sectional views, the various steps of a method for manufacturing, printing a part using SLA stereolithography.

The manufacture or printing of a green part by SLA laser stereolithography is shown in FIG. 1. This thus shows steps a) toe) of the claimed method.

The method shown in FIG. 1 is implemented using an appliance, i.e. a printer, comprising a printing plate (print bed) (11), and a transparent tank (12) that is transparent to UV laser light, comprising a transparent bottom (13). The tank receives a photopolymerisable resin composition (14).

The appliance further comprises a UV laser (15) disposed beneath the transparent bottom (13) of the tank (12) for emitting a UV laser radiation, for example at a wavelength of 405 nm, and a pivoting mirror (16) also disposed under the transparent bottom (13) of the tank (12) for directing the beam emitted by the laser (15) and for causing the beam (17) emitted by the laser (15) to irradiate the resin according to a design or pattern defined in the X, Y plane.

In FIG. 1, the UV laser (15) is disposed beneath the transparent bottom (13) of the tank (12), but it goes without saying that the laser could be disposed differently, for example above the tank (12) and the printing plate, in which case the green part is printed on the top face of the printing plate and not on the bottom face of the printing plate as shown in FIG. 1.

This method comprises the following successive steps:

Step 1: the printing plate (11) is lowered into the resin tank (12) at a distance comprised, for example, between 5 and 100 μm from the bottom of the tank (13).

Step 2: the laser beam (17) emitted by the laser (15) and directed by the mirror (16) irradiates the resin (14) according to a design or pattern automatically defined by the printer, which uses the informations contained in a digital file (see FIG. 2). At the end of this step, the first layer of the object to be printed is polymerised (18).

Step 3: the plate (11) rises to allow the non-polymerised resin to flow out from under the plate (11).

Step 4: the plate (11) is lowered back into the tank (12) of resin (14). The distance between the last printed layer (18) and the bottom (13) of the tank is comprised, for example, between 5 and 100 μm. As in step 2, the laser beam (17) irradiates the resin (14) to allow the next layer (19) to be polymerised. The pattern thereof (19) is not necessarily the same as that of the first layer (18).

Then, steps 3 and 4 are repeated (for example 1 to 2,000 times, preferably 2 to 1,000 times, more preferably 3 to 600 times, even more preferably 4 to 500 times) until the entire final part with all the layers (110) is obtained.

Step 5: The entire green part (110) is printed under the printing plate (11).

The printing process thus produces printed green parts.

The entire printed green part may then be detached from the printing plate.

The entire printed green part may then be cleaned to remove the non-polymerised resin.

This cleaning may be carried out by bringing the part still attached to the printing plate (FIG. 4) or detached from the printing plate into contact with an organic solvent (for example by immersion or dipping in a solvent bath).

This organic solvent is preferably selected from alcohols, more preferably from aliphatic alcohols of 1 to 10 C such as ethanol, isopropanol, n-propanol, butanols and mixtures thereof. Isopropanol is preferred.

The cleaning may comprise a plurality of successive steps carried out on the printed green part still attached to the printing plate or detached from the printing plate. These steps may use the same solvent or different solvents and/or have the same duration or different durations.

For example, the cleaning may comprise a first step wherein the printed green part still attached to the printing plate is brought into contact with a first organic solvent (for example by immersion, by dipping in a bath of the solvent). During this first step, the non-polymerised resin will detach from the printed green part and, for example, settle to the bottom of the container containing the bath. This first step may last from 15 minutes to 60 minutes, for example about 30 minutes.

The cleaning may then comprise a second cleaning step wherein the printed green part that has been detached from the printing plate is brought into contact with a second solvent (for example by immersion, by dipping in a bath of the solvent) to finish dissolving any non-polymerised resin.

This second step may last, for example, from between 1 h and 12 h. The more complex the architecture of the part, the longer the cleaning process and in particular the longer this second step will take to achieve good cleaning.

Drying of the Cleaned Printed Green Parts

The cleaned printed green parts may be dried in the open air. The parts may be dry, for example, in about 1 h.

The green part is also seen to cure during this step, as the polymerisation of the resin continues during this time.

Debinding and Sintering of the Printed and Cleaned Green Parts

As already described hereinabove, the heat treatment carried out to completely remove the organic constituents from the green part and to sinter and densify the green part may comprise a plateau at a temperature from 800° C. to 1,700° C., preferably from 1,100° C. to 1,300° C., for example 1,200° C., for a period of 1 to 10 hours, for example 5 hours; and the heat treatment to partially remove the organic constituents from the green part may comprise a plateau at a temperature from 100° C. to 500° C., preferably from 100° C. to 200° C., more preferably from 150° C. to 200° C.

The heat treatment may be carried out in an air atmosphere, in a neutral gas atmosphere, or in a reducing atmosphere.

The microstructures of the manufactured parts depend on the sintering cycle carried out. A slow debinding cycle with several plateaus (for example at temperatures of 300° C. and 550° C.) is recommended to limit the residual carbon content in the final ceramic, especially in the case where pre-ceramic compounds, such as pre-ceramic polymers, are used. Sintering temperatures must be adapted to the precursor and the particle size distribution used. Due to the low pyrolysis temperature of ceramic compounds, such as pre-ceramic polymers, which is typically from 800° C. to 1,000° C., the sintering temperature of the hybrid parts is much lower than that used when sintering the parts consisting of an oxide ceramic only.

Moreover, due to the lower sintering temperature for nanometric powders (which is about 900° C. for silica) and the crystalline phases that can form during the thermal cycle, the mechanical properties of the final ceramic are thus dependent on the sintering temperature.

For a part composed of a bimodal mixture of oxide ceramic particles, for example silica, with for example a distribution of 70 wt % of micrometric particles/30 wt % of nanometric particles, it is recommended to carry out the sintering at 1,150° C. in particular to prevent the formation of the crystalline cristobalite phase from 1,200° C.

This temperature increases as the proportion of micrometric particles increases.

A debinding-sintering cycle is shown in FIG. 5.

This cycle with a sintering plateau at 1,200° C. is used when the parts are made with a mixture of microscale and nanoscale powders.

The cycle was defined using dilatometric and thermal gravimetric analyses. The entire cycle is carried out in a furnace supplied by Pyrox®.

The temperature of the sintering plateau was optimised as a function of the results of the mechanical characterizations that were carried out on parts of the same composition.

Sintering plateaus of 1,150° C., 1,200° C., 1,250° C. and 1,300° C. were studied and the temperature of 1,200° C. (shown in FIG. 5), and the temperature of 1,150° C. were chosen in view of the better mechanical strength and lower deformation of the part obtained when using these temperatures.

The cycle shown in FIG. 5 comprises a first temperature ramp up to 250° C. at a rate of 35° C./h.

A plateau corresponding to a first debinding lasting 5 hours is then implemented at this temperature of 250° C.

A second temperature rise up to 500° C. at a rate of 35° C./h is then carried out.

Then, a plateau corresponding to a second debinding step is implemented for 3 hours at this temperature of 500° C.

Finally, a temperature rise up to the sintering plateau temperature, i.e. 1,200° C. in FIG. 5 (but the temperature of 1,150° C. may also be used) is carried out at a rate of 100° C./h.

The sintering plateau lasts 5 hours.

Cooling then takes place at a rate of 100° C./h to reach 20° C.

This sintering cycle in FIG. 5 can also be used when the parts are produced with a precursor comprising a mixture of a pre-ceramic polymer and a mixture of a micrometric powder and a nanometric powder.

In the case of the production of parts from nanometric powder and pre-ceramic polymer, sintering temperatures of 1,150° C. and 1,200° C. may be used. Temperature ramps rates and plateaus times remain unchanged.

The invention will now be described with reference to the following examples, which are provided for illustration purposes and are not limiting.

In these examples, oxide ceramic parts, more precisely silica parts, are manufactured with compositions according to the invention using the method according to the invention.

The following paragraphs describe how, in the examples, in order to manufacture, make, ceramic parts, a photocrosslinkable composition, formulation, resin for SLA is firstly prepared, then this composition is used to manufacture, print green parts using an SLA stereolithography machine, then the printed green parts are cleaned, then the cleaned printed green parts are dried, and finally the debinding and sintering of the printed and cleaned green parts is carried out.

Raw Materials

The silica powders with micrometric sizes are supplied by IMERYS Fused Minerals (USA). The spherical powders (known as Teco-Sphere AM) are amorphous, with a size distribution comprised between 1 and 10 micrometres and a $d_{50}$ of 3.8 µm.

The powders with nanometric sizes are supplied by Get-NanoMaterials (France). The nanopowders (known as $SiO_2$—100-C1) are amorphous, with an elemental size comprised between 15 and 30 nanometres, and form spherical agglomerates with a diameter comprised between 1 and 2 µm.

The particle size was estimated by a dynamic light scattering technique using a Malvern Zetasizer® Nano-ZS laser particle size analyser. The measurements are carried out by the technique known as Photon Correlation Spectroscopy (PCS). This technique consists of measuring the diffraction and the scattering of a monochromatic beam by a colloidal solution of the particles contained in a test vessel. The speed at which the particles move, thanks to Brownian motion, is thus measured. This speed is then used to deduce the dimensions of the particles measured.

Observations were also made for the nanometric and micrometric powders using a transmission electron microscope (TEM) or using a scanning electron microscope (SEM). The protocol for preparing the samples is identical for observation using a transmission electron microscope (TEM) or using a scanning electron microscope (SEM).

The particles are put in solution in ethanol and the mixture is stirred with a vibrating table. A small fraction of the mixture is then taken and deposited on the substrate suitable for the observation (carbon "tape" "Scotch®" or TEM grid). The solvent is evaporated in the open air at ambient temperature and the substrate is then directly observed.

Observation of the nanometric silica powder under a transmission electron microscope shows that the nanometric silica powder forms spherical agglomerates with a diameter comprised between about 1 and 1.5 µm. The elemental size of the particles forming the agglomerates is comprised between 20 and 30 nm.

The micrometric silica powder is observed with a scanning electron microscope.

A plurality of particle sizes can be identified from the SEM images. Particles with diameters comprised between 0.8 and 3.7 µm are mostly observed, which particles can form larger agglomerates.

Preparation of the Photocrosslinkable Composition, Formulation, Resin for SLA

The appropriate quantities of photopolymerisable organic compounds (acrylates) and dispersant are firstly mixed in a first container of the plastic pot type using an IKA® RW20 mechanical stirrer for 15 to 30 minutes. The speed of rotation is set between 220 and 450 revolutions per minute (rpm).

During the time of this mixing process, the appropriate quantities of precursors, i.e. of nanometric silica powder and of micrometric silica powder and/or of pre-ceramic precursors polymers are successively weighed and added in a second container. The precursors added in the second container are then mixed manually using a spatula to slightly homogenise the mixture.

The mixture prepared in the second container is then added little by little using a spatula in the first container containing the photopolymerisable organic compounds (acrylates) and the dispersant, under mechanical stirring. The speed of rotation is comprised between 350 and 550 rpm. The slow addition of the mixture prepared in the second container prevents any sudden increase in the viscosity of the resin and ensures better homogeneity compared to the case where the different types of precursors are added quickly and successively. The addition of 100 g of precursors mixture in 150 g of photopolymerisable organic compounds (and dispersant) takes place in 1-2 hours. The mixture ultimately obtained is then left under stirring for 30 minutes at a speed comprised between 350 and 550 rpm.

The appropriate weights of photoinitiator and UV absorber are added last to the previously obtained mixture, still under stirring. Stirring of the resin continues for 30 minutes.

The resin is then degassed under a vacuum bell jar (hermetically sealed glassware connected to a primary pump). The degassing time is comprised between 15 minutes and 30 minutes until the foam and bubbles that form on the surface of the resin during degassing completely disappear.

The resin is then placed on a turning roller away from light sources until it is used in the stereolithography printer.

This allows further homogenisation of the resin and prevents the particles from settling. If the resin is to be used several days after production thereof, it can be stored without stirring, however it is recommended that it be placed on the turning roller one to two hours before use.

Description of the SLA Stereolithography Machine Used in the Examples and of the Printing of the Green Parts Using this Machine The SLA printing method implemented is substantially as described hereinabove, in particular with reference to FIG. 1.

The appliance, machine used is model 028J available from Digital Wax Systems DWS® of Thiene (Italy).

The emission wavelength of the laser is 402 nm. The main components of the machine are:
- the printing plate (print bed), which is the moving part of the printer.
- the tank containing the resin prepared as described hereinabove.
- the laser and the set of mirrors (in the covered part of the printer).

The DWS® printer is controlled by the FICTOR® software, also developed by DWS.

The digital file used in this software, specifically developed for the manufacture of the parts in the examples, is shown in FIG. 3.

The dimensions of the printing plate are 6.5 cm×6.5 cm×9 cm (L×W×H)

The printing parameters are managed using the Fictor software.

During the polymerisation process of a layer, the laser will firstly produce a hatching (21) before producing contours (22) as shown in FIG. 2.

The distances between the laser passes for the hatching, the contours, etc. can be changed using the FICTOR® software.

The different parameters that can be changed are as follows:

"Number of manufacturing blocks": the printer allows the user to change the laser parameters during the same print run. For example, the printer can thus be instructed to increase the laser speed once it has completed the first 4 layers or to increase the number of contours once it has reached the 17$^{th}$ layer.

"To Z": this parameter corresponds to the height of the part up to which the laser will use the parameters of the current block.

"Layers" corresponds to the number of layers the printer will produce before moving on to the next block, this parameter is automatically calculated as a function of the "To Z" and the layer thickness.

"Slice": this parameter corresponds to the thickness of each layer, and can also be interpreted as the pitch on the Z axis. Depending on the file format used, it may happen that the "Slice" value cannot be changed.

"Contours Number": the number of contours that the printer will produce. If the user inputs a value greater than or equal to 1, the printer will produce the number of contours accordingly. A value of 0 can be input in order to have no contour, however a value of −1 can also be input so that the printer does not produce any hatching and only outlines, contours.

"Indentation": this is the distance (23) between the first contour and the first hatching.

"Hatching": this parameter corresponds to the space (24) between two laser passes in the hatching area.

"Z Compensation": typically, when printing a part, the height of the part will always be greater than the requested value. This parameter partially compensates for this defect.

"Laser Speed": this is an important parameter to consider, since it allows the energy density received by the resin to be modulated.

The slower the speed, the more amount of energy the resin receives.

The lapse of time between two laser passes can also be controlled.

All of the parts manufactured in the examples were manufactured with identical parameters. These parameters are as follows:
Z pitch: 50 µm
Block 1: 4 layers.
Contours number: 3
Indentation: 30 µm
Hatching: 30 µm
Laser speed: 258 mm/s Block 1 corresponds to the printing of the very first layers. The laser speed is very slow and allows the part to adhere to the printing plate.

Block 2: 561 layers
Contours number: 1
Indentation: 30 µm
Hatching: 30 µm
Laser speed: 3,000 mm/s.

Block 2 really corresponds to the actual printing of the part. The laser speed is thus much faster than for Block 1.

The digital file used to manufacture the parts in the examples, is shown in FIG. 3. This digital file makes it possible to simultaneously print 9 identical microstructured cylinders, which shows that the method according to the invention is perfectly reproducible.

The cylinders consist of 565 layers, each 50 µm thick. The dimensions of the cylinder are 20.25×28.25 mm (φ×h)

At the end of the printing process printed green parts are obtained.

Cleaning and Post-Treatment of the Printed Green Parts

Once the printing of the green part is complete, the part is cleaned in two steps.

The description of this specific embodiment of the cleaning process not only applies to the specific examples that follow but is generally applicable.

First Cleaning Step

This step is shown in FIG. 4.

The printed green part (41) still attached to the printing plate (42) is dipped in a first bath (43) of an alcohol-type cleaning solvent (isopropanol is recommended, but ethanol can also be used as a solvent) (the solvent specifically used in the examples is isopropanol) placed in a container (44).

During this first step, the non-polymerised resin will detach from the printed green part (41) and settle to the bottom of the container (44). This first step lasts about 30 minutes.

Second Cleaning Step

The printed green part is then detached from the printing plate and dipped in a second solvent bath to finish dissolving any non-polymerised resin. This second bath lasts between 1 h and 12 h (the specific duration used in the examples is 10 h). The more complex the architecture of the part, the longer the bath will take to achieve good cleaning.

Drying of the Cleaned Printed Green Parts

The cleaned printed green parts are dried in the open air.

The parts are dry within about 1 h.

The green part is also seen to cure during this step, as the polymerisation of the resin continues during this time.

Debinding and Sintering of the Printed and Cleaned Green Parts

The debinding-sintering cycle is shown in FIG. 5.

This cycle with a sintering plateau at 1,200° C. is used when the parts are made with a mixture of micrometric and nanometric powders (Example 1).

The cycle was defined using dilatometric analyses and thermal gravimetric analyses. The entire cycle is carried out in a furnace supplied by Pyrox®.

The temperature of the sintering plateau was optimised as a function of the results of the mechanical characterizations that were carried out on parts of the same composition.

Sintering plateau temperatures of 1,150° C., 1,200° C., 1,250° C. and 1,300° C. were studied and the temperature of 1,200° C. (shown in FIG. 5), and the temperature of 1,150° C. (see below) were chosen in view of the better mechanical strength and lower deformation of the part obtained when using these temperatures.

The cycle shown in FIG. 5 comprises a first temperature ramp up to 250° C. at a rate of 35° C./h.

A plateau corresponding to a first debinding step lasting 5 hours is then implemented at this temperature of 250° C.

A second temperature rise up to 500° C. at a rate of 35° C./h is then carried out.

Then, a plateau corresponding to a second debinding step is implemented for 3 hours at this temperature of 500° C.

Finally, a temperature rise up to the sintering plateau temperature, i.e. 1,200° C. in FIG. 5 (but the temperature of 1,150° C. was also used in Example 5) is carried out at a rate of 100° C./h.

The sintering plateau lasts 5 hours.

Cooling then takes place at a rate of 100° C./h down to 20° C.

This sintering cycle in FIG. 5 is also used when the parts are produced with a precursor comprising a mixture of a pre-ceramic polymer and a mixture of a micrometric powder and a nanometric powder (Example 4).

In the case of the production of parts from nanoscale powder and pre-ceramic polymer, sintering temperatures of 1,150° C. (Example 5) and 1,200° C. (Examples 2 and 3) are used. Temperature ramps rates and plateaus times remain unchanged.

In all examples, sintering is carried out in air.

EXAMPLES

Example 1

In this example, parts made of oxide ceramic, i.e. silica, are prepared.

The preparation of the photocrosslinkable composition, formulation, resin for SLA, the SLA stereolithography machine used, the printing of the green parts using this machine, the cleaning of the printed parts, the drying of the printed and cleaned green parts, and finally the debinding and the sintering of the printed and cleaned green parts are as described hereinabove.

The photocrosslinkable composition, formulation, resin for SLA used in this example comprises ceramic precursors which are micrometric and nanometric ceramic powders only, with an overall filler content of 40 wt %, and the following particle size distribution: 70 wt % of micrometric powder and 30 wt % of nanometric powder ("70% μm/30% nm").

This composition or formulation is described in Table 1 hereinbelow.

TABLE 1

| | Weight percentage | Description |
| --- | --- | --- |
| Poly(ethylene glycol) 700 diacrylate | 29.215% | Monomer |
| 1,6-hexanediol diacrylate | 29.215% | Monomer |
| Irgacure 819 | 0.6% | Photoinitiator |
| Sudan 1 | 0.06% | UV absorber |
| Phosphoric ester diacrylate | 1% | Dispersant |
| Micrometric silica | 28% | Ceramic precursor ceramic powder |
| Nanometric silica | 12% | Ceramic precursor ceramic powder |

FIG. 6 shows a photograph of the part, which is a microstructured cylinder, manufactured in this example, at the end of the sintering heat treatment.

The sintering temperature in this case is 1,200° C.

The sintering is carried out in air.

The part obtained is easy to handle and is not fragile.

Example 2

In this example, parts made of oxide ceramic, i.e. silica, are prepared.

The preparation of the photocrosslinkable composition, formulation, resin, the stereolithography machine used, the printing of the green parts using this machine, the cleaning of the printed parts, the drying of the printed and cleaned green parts, and finally the debinding and the sintering of the printed and cleaned green parts are as described hereinabove.

The photocrosslinkable composition, formulation, resin for SLA used in this example may be referred to as a "hybrid" resin, since it comprises two types of ceramic (silica) precursors, i.e. (1) a nanometric ceramic powder, and (2) a pre-ceramic precursor polymer.

The composition has an overall ceramics precursors filler content of 40 wt %, with 30 wt % of nanometric ceramic powders and 10 wt % of pre-ceramic precursor polymer.

This composition, formulation is described in Table 2 hereinbelow.

TABLE 2

| Precursor | Weight percentage | Description |
| --- | --- | --- |
| Poly(ethylene glycol) 700 diacrylate | 21.9% | Monomer |
| 1,6-hexanediol diacrylate | 36.26% | Monomer |
| Irgacure 819 | 0.60% | Photoinitiator |
| Sudan 1 | 0.06% | UV absorber |
| Phosphoric ester diacrylate | 0.64% | Dispersant |
| Nanometric silica | 29.96% | Ceramic powder |
| Silres ® H44 | 10.59% | Pre-ceramic precursor polymer |

*The weight percentage indicated takes into account the conversion rate of the pre-ceramic polymer to ceramic, which is 50 wt %.
*Silres ® H44 is a silicone resin available from WACKER ®.

The left-hand side of FIG. 7 shows a photograph of the part, which is a microstructured cylinder, manufactured in this example, after the sintering heat treatment.

The sintering temperature in this case is 1,200° C.

The sintering is carried out in air.

The part obtained is easy to handle and is not fragile.

Example 3

In this example, parts made of oxide ceramic, i.e. silica, are prepared.

The preparation of the photocrosslinkable composition, formulation, resin, the stereolithography machine used, the printing of the green parts using this machine, the cleaning of the printed parts, the drying of the printed and cleaned green parts, and finally the debinding and the sintering of the printed and cleaned green parts are as described hereinabove.

The photocrosslinkable composition, formulation, resin for SLA used in this example may be referred to as a "hybrid" resin, since it comprises two types of ceramic (silica) precursors, i.e. (1) a nanometric ceramic powder, and (2) a pre-ceramic precursor polymer.

The composition has an overall ceramics precursors filler content of 40 wt %, with 25 wt % of nanometric ceramic (silica) powders and 15 wt % of pre-ceramic precursor polymer.

This composition or formulation is described in Table 3 hereinbelow.

TABLE 3

| Precursor | Weight percentage | Description |
| --- | --- | --- |
| Poly(ethylene glycol) 700 diacrylate | 29.19% | Monomer |
| 1,6-hexanediol diacrylate | 29.51% | Monomer |
| Irgacure 819 | 0.58% | Photoinitiator |
| Sudan 1 | 0.06% | UV absorber |
| Phosphoric ester diacrylate | 0.63% | Dispersant |
| Nanometric silica | 26.14% | Ceramic powder |
| Silres ® H44 | 13.89% | Pre-ceramic precursor polymer |

*The weight percentage indicated takes into account the conversion rate of the pre-ceramic precursor polymer to ceramic, which is 50 wt %.

The right-hand side of FIG. 7 shows a photograph of the part, which is a microstructured cylinder, manufactured in this example, after the sintering heat treatment.

The sintering temperature in this case is 1,200° C.

The sintering is carried out in air.

The preparation conditions for the parts prepared in Examples 2 and 3 are identical (printing parameters, sintering parameters).

Only the resin formulation differs and explains the observed difference in dimensions. The part with the highest pre-ceramic precursor polymer content has smaller dimensions due to the high shrinkage caused by this compound during sintering.

The part obtained is easy to handle and is not fragile.

Example 4

In this example, parts made of oxide ceramic, i.e. silica, are prepared.

The preparation of the photocrosslinkable composition, formulation, resin, the stereolithography machine used, the printing of the green parts using this machine, the cleaning of the printed parts, the drying of the printed and cleaned green parts, and finally the debinding and the sintering of the printed and cleaned green parts are as described hereinabove.

The photocrosslinkable composition, formulation, photocrosslinkable resin for SLA used in this example may be referred to as a "hybrid" resin, since it comprises two types of ceramic precursors, i.e. (1) micrometric and nanometric ceramic powders, and (2) a pre-ceramic precursor polymer.

The composition has an overall ceramics precursors filler content of 42 wt %, with 34 wt % of ceramic powders and 8 wt % of pre-ceramic precursor polymer.

The particle size distribution of the ceramic powders is as follows: 80 wt % of microscale powder and 20 wt % of nanoscale powder ("80%μm/20% nm").

This composition, formulation is described in Table 4 hereinbelow.

TABLE 4

| Precursor | Weight percentage | Description |
| --- | --- | --- |
| Poly(ethylene glycol) 700 diacrylate | 28.33% | Monomer |
| 1,6-hexanediol diacrylate | 27.41% | Monomer |
| Irgacure 819 | 0.57% | Photoinitiator |
| Sudan 1 | 0.06% | UV absorber |
| Phosphoric ester diacrylate | 0.88% | Dispersant |
| Micrometric silica | 27.47% | Ceramic powder |
| Nanometric silica | 7.01% | Ceramic powder |
| Silres ® H44 | 8.27% | Pre-ceramic precursor |

*The weight percentage indicated takes into account the conversion rate of the pre-ceramic polymer to ceramic, which is 50 wt %.

FIG. 8 shows a photograph of the part, which is a microstructured cylinder, manufactured in this example, after the sintering heat treatment.

The sintering temperature in this case is 1,200° C.

The sintering is carried out in air.

The part obtained is easy to handle and is not fragile.

Example 5

In this example, parts made of oxide ceramic, i.e. silica, are prepared.

The preparation of the photocrosslinkable composition, formulation, resin, the stereolithography machine used, the printing of the green parts using this machine, the cleaning of the printed parts, the drying of the printed and cleaned green parts, and finally the debinding and the sintering of the printed and cleaned green parts are as described hereinabove.

The photocrosslinkable composition, formulation, resin for SLA used in this example may be referred to as a "hybrid" resin, since it comprises two types of ceramic (silica) precursors, i.e. (1) a nanometric ceramic powder, and (2) a pre-ceramic precursor polymer.

The composition has an overall ceramics precursors filler content of 37 wt %, with 23.5 wt % of nanometric ceramic (silica) powders and 13.5 wt % of pre-ceramic precursor polymer.

This composition, formulation is described in Table 5 hereinbelow.

It should be noted that this composition, formulation is different from those in Examples 1 to 4 described hereinabove, in particular with regard to the proportion of photocrosslinkable monomers and the use of a different UV absorber.

TABLE 5

| Precursor | Weight percentage | Description |
| --- | --- | --- |
| Poly(ethylene glycol) 700 diacrylate | 44.16% | Monomer |
| 1,6-hexanediol diacrylate + HEA diluent | 17.55% | Monomer |
| Irgacure 819 | 0.58% | Photoinitiator |
| UV absorber 133 | 0.07% | UV absorber |
| Phosphoric ester diacrylate | 0.56% | Dispersant |
| Nanometric silica | 23.54% | Ceramic powder |
| Silres ® H44 | 13.55% | Pre-ceramic precursor |

*The weight percentage indicated takes into account the conversion rate of the pre-ceramic polymer to ceramic, which is 50 wt %.

FIGS. 9 and 10 show photographs of the part, which is a microstructured cylinder, manufactured in this example, at the end of the sintering heat treatment.

The sintering temperature in this case is 1,150° C.

The sintering is carried out in air.

The dimensions of this part are as follows: height=16.97 mm, diameter ϕ=12.55 mm.

The part obtained is easy to handle and is not fragile.

All of the photocrosslinkable compositions, formulations, resins of the examples have a viscosity of 1 Pa·s at 20° C. under a shear of 50 s$^{-1}$.

Table 6 hereinbelow shows the levels of detail, i.e. the diameters of the filaments that make up the parts prepared in the examples.

TABLE 6

| | Level of detail |
| --- | --- |
| Example 1 | 230-250 μm |
| Example 2 | 190-210 μm |
| Example 3 | 180-200 μm |
| Example 4 | 220-250 μm |
| Example 5 | 200-230 μm |

It should be noted that this level of detail is very small.

What is claimed is:

1. Composition for manufacturing a part consisting of at least one oxide ceramic, or a hybrid part comprising at least one oxide ceramic and organic constituents, by a stereolithography technique, said composition consisting of:
at least one photopolymerisable organic compound;
at least one photoinitiator;
at least one precursor of the oxide ceramic;
optionally at least one UV absorbing agent;
optionally at least one dispersing agent; and
optionally at least one plasticising agent;

wherein:
said composition comprises from 25 wt % to 70 wt %, relative to the total weight of the composition, of the at least one precursor of the oxide ceramic; and wherein:
said at least one precursor of the oxide ceramic comprises a mixture comprising a nanometric powder of the oxide ceramic, and a micrometric powder of the oxide ceramic;
the mixture comprising a nanometric powder of the oxide ceramic and a micrometric powder of the oxide ceramic comprises from 10 wt % to 30 wt %, relative to the weight of the mixture, of the nanometric powder of the oxide ceramic, and from 70 wt % to 90 wt %, relative to the weight of the mixture, of the micrometric powder of the oxide ceramic.

2. Composition according to claim 1, wherein said at least one precursor of the oxide ceramic consists of a mixture consisting of a nanometric powder of the oxide ceramic and a micrometric powder of the oxide ceramic.

3. Composition according to claim 1, wherein said at least one precursor of the oxide ceramic comprises a mixture comprising:
a mixture of a nanometric powder of the oxide ceramic and of a micrometric powder of the oxide ceramic, and
a pre-ceramic compound of the oxide ceramic.

4. Composition according to claim 3, wherein the composition comprises from 40 wt % to 90 wt %, relative to the total weight of the composition, of the mixture of the nanometric powder of the oxide ceramic and of the micrometric powder of the oxide ceramic; and from 10 wt % to 60 wt %, relative to the total weight of the composition, of the pre-ceramic compound of the oxide ceramic.

5. Composition according to claim 1, wherein the oxide ceramic is selected from metals oxides, metalloids oxides, mixed metals and/or metalloids oxides, and mixtures of said metals oxides, metalloids oxides, and mixed metals and/or metalloids oxides.

6. Composition according to claim 5, wherein the oxide ceramic is selected from oxides and mixed oxides of transition metals; silica; alumina; and mixtures thereof.

7. Composition according to claim 3, wherein the pre-ceramic compound of the oxide ceramic is selected from polysiloxanes; geopolymers; silsesquioxanes; and mixtures thereof.

8. Composition according to claim 1, comprising from 30 wt % to 75 wt % relative to the total weight of the composition, of the at least one photopolymerisable organic compound.

9. Composition according to claim 1, wherein the photopolymerisable organic compound is selected from photopolymerisable organic compounds comprising at least one function selected from acrylate, epoxy, urethane and vinyl functions.

10. Composition according to claim 9, wherein the photopolymerisable organic compound is selected from polyacrylates comprising more than two acrylate functions; polymers comprising at least two acrylate functions; non-polymeric compounds comprising one or two acrylate functions, referred to as reactive diluents; and
mixtures thereof.

11. Composition according to claim 10, wherein the composition comprises at least one first photopolymerisable organic compound selected from polyacrylates comprising more than two acrylate functions, and polymers comprising at least two acrylate functions; and at least one second photopolymerisable organic compound selected from non-polymeric compounds comprising one or two acrylate functions, referred to as reactive diluents.

12. Composition according to claim 11, wherein the composition comprises from 10 wt % to 60 wt % relative to the total weight of the composition, of the at least one first photopolymerisable organic compound, and from 10 wt % to 50 wt % relative to the total weight of the composition, of the at least one second photopolymerisable organic compound.

13. Composition according to claim 12, wherein the weight ratio of the first photopolymerisable organic compound to the second polymerisable organic compound is from 2:1 to 1:1.

14. Composition according to claim 1, wherein, when said composition comprises at least one UV absorbing agent, said at least one UV absorbing agent is present in an amount of 0.05 wt % to 1 wt % of the weight of the composition.

15. Composition according to claim 1, wherein, when said composition comprises at least one dispersing agent, said at least one dispersing agent is present in an amount of 1 wt % to 5 wt % of the weight of the composition.

16. Composition according to claim 1, wherein, when said composition comprises at least one plasticising agent, said at least one plasticizing agent is selected from glycols, phthalates and glycerol.

17. Method for manufacturing a part consisting of at least one oxide ceramic, or a hybrid part comprising at least one oxide ceramic and organic constituents by a stereolithography technique, comprising the following successive steps:
  a) bringing a substrate into contact with a layer of the composition according to claim 1;
  b) exposing one or more selected area(s) of the layer of the composition to a photon radiation to obtain a first locally-polymerised layer of the part;
  c) bringing the first locally-polymerised layer into contact with a layer of the composition according to claim 1;
  d) exposing one or more selected area(s) of said layer of the composition to a photon radiation to obtain a second locally-polymerised layer of the part;
  e) repeating steps c) and d) as many times as necessary for the locally-polymerised layers to constitute a green part;
  f) separating the green part from the substrate;
  g) optionally, at the end of step e) and/or step f), cleaning the green part by bringing it into contact with an organic solvent;
  h) optionally, drying the cleaned green part;
  i) subjecting the greet part to heat treatment to completely remove the organic constituents from the green part and to sinter and densify the green part to obtain a part consisting of at least one oxide ceramic; or subjecting the greet part to heat treatment to partially remove the organic constituents from the green part, whereby a hybrid part comprising at least one oxide ceramic and organic constituents is obtained.

18. Method according to claim 17, wherein the photon radiation is a UV radiation.

19. Method according to claim 17, wherein, in step i), the heat treatment carried out to completely remove the organic constituents from the green part and to sinter and densify the green part comprises a plateau at a plateau temperature from 800° C. to 1,700° C., for a period of 1 to 10 hours; and the heat treatment to partially remove the organic constituents from the green part comprises a plateau at a temperature from 100° C. to 500° C., preferably from 100° C. to 200° C., more preferably from 150° C. to 200° C. for a period of 1 to 10 hours, for example 5 hours.

20. Method according to claim 19, wherein, in step i), during the heat treatment carried out to completely remove the organic constituents from the green part and to sinter, densify the green part, the plateau temperature is reached within a period of 10 to 40 hours.

21. Method according to claim 17, wherein the heat treatment is carried out in an air atmosphere, in a neutral gas atmosphere, or in a reducing atmosphere.

22. Method according to claim 17, further comprising, at the end of step i), a step wherein the part consisting of at least one oxide ceramic, or the hybrid part comprising at least one oxide ceramic and organic constituents, which acts as a ceramic reinforcement with an open-pored three-dimensional porous structure forming a matrix or lattice, receives a thermal insulator.

23. Method according to claim 17, further comprising, at the end of step i), a step wherein the part consisting of at least one oxide ceramic, or the hybrid part comprising at least one oxide ceramic and organic constituents, which has an open-pored three-dimensional porous structure, is functionalised by chemical groups.

24. Part consisting of at least one oxide ceramic, or hybrid part comprising at least one oxide ceramic and organic constituents, obtained by the method according to claim 17, wherein the part consisting of at least one oxide ceramic contains less than 100 ppm of carbon, and the hybrid part comprising at least one oxide ceramic and organic constituents comprises more than 10 wt % of carbon.

25. Part consisting of at least one oxide ceramic, or hybrid part comprising at least one oxide ceramic and organic constituents according to claim 24 wherein the part consisting of at least one oxide ceramic or the hybrid part comprising at least one oxide ceramic and organic constituents comprises a dense three-dimensional structure, or an open-pored three-dimensional porous structure capable of being used as an open-pored three-dimensional porous host matrix.

26. Part consisting of at least one oxide ceramic, or hybrid part comprising at least one oxide ceramic and organic constituents according to claim 24, said part being a catalyst.

* * * * *